United States Patent
Chen et al.

(10) Patent No.: US 11,432,343 B2
(45) Date of Patent: Aug. 30, 2022

(54) UPLINK SIGNAL TRANSMISSION METHOD AND USER EQUIPMENT

(71) Applicant: VIVO MOBILE COMMUNICATION CO., LTD., Chang'an Dongguan (CN)

(72) Inventors: Xiaohang Chen, Chang'an Dongguan (CN); Peng Sun, Chang'an Dongguan (CN); Hao Liu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/032,329

(22) Filed: Sep. 25, 2020

(65) Prior Publication Data

US 2021/0058980 A1    Feb. 25, 2021

Related U.S. Application Data

(63) Continuation of application No. PCT/CN2019/077792, filed on Mar. 12, 2019.

(30) Foreign Application Priority Data

Mar. 29, 2018 (CN) .......................... 201810274370.2

(51) Int. Cl.
*H04W 74/08* (2009.01)
*H04L 5/00* (2006.01)
(Continued)

(52) U.S. Cl.
CPC ......... *H04W 74/0883* (2013.01); *H04L 5/001* (2013.01); *H04L 5/0092* (2013.01);
(Continued)

(58) Field of Classification Search
CPC ............. H04W 74/0883; H04W 72/02; H04W 72/048; H04W 72/085; H04W 72/042;
(Continued)

(56) References Cited

U.S. PATENT DOCUMENTS

2011/0039499 A1\* 2/2011 Zhang ................ H04W 74/008
455/67.11
2014/0044108 A1   2/2014 Earnshaw et al.
(Continued)

FOREIGN PATENT DOCUMENTS

CN        102055705 A     5/2011
CN        102387101 A     3/2012
(Continued)

OTHER PUBLICATIONS

International Search Report & Written Opinion related to Application No. PCT/CN2019/077792; dated Oct. 8, 2020.
(Continued)

*Primary Examiner* — Hardikkumar D Patel
(74) *Attorney, Agent, or Firm* — von Briesen & Roper, s.c.

(57) ABSTRACT

This disclosure provides an uplink signal transmission method and user equipment and relates to the field of communications technologies. The uplink signal transmission method includes: selecting, by the user equipment, a CP from a preset cyclic prefix CP candidate set to send an uplink transmission signal, where the CP candidate set includes at least two types of CPs of different lengths.

10 Claims, 2 Drawing Sheets

(51) Int. Cl.
  *H04L 27/26* (2006.01)
  *H04W 72/02* (2009.01)
  *H04W 72/04* (2009.01)
  *H04W 72/08* (2009.01)
(52) U.S. Cl.
  CPC ......... *H04L 27/2607* (2013.01); *H04W 72/02* (2013.01); *H04W 72/048* (2013.01); *H04W 72/085* (2013.01)
(58) Field of Classification Search
  CPC ..... H04W 28/06; H04W 72/00; H04W 72/04; H04W 74/08; H04L 5/001; H04L 5/0092; H04L 27/2607; H04L 27/26025; H04L 5/0064; H04L 5/006; H04L 27/2602; H04L 5/0035; H04L 5/0028; H04L 5/0023; H04L 1/00; H04L 5/00; H04L 1/0006; H04L 5/0048; H04B 7/2615
  See application file for complete search history.

(56) References Cited

U.S. PATENT DOCUMENTS

| | | | |
|---|---|---|---|
| 2015/0208394 A1* | 7/2015 | Seo | H04L 5/0053 370/329 |
| 2016/0241308 A1 | 8/2016 | Kim et al. | |
| 2017/0164350 A1* | 6/2017 | Sun | H04W 72/0453 |
| 2018/0083817 A1 | 3/2018 | Salem et al. | |
| 2018/0091267 A1* | 3/2018 | Kim | H04L 5/0007 |
| 2018/0213494 A1 | 7/2018 | Lu et al. | |
| 2020/0059337 A1* | 2/2020 | Yamada | H04W 72/042 |
| 2020/0336348 A1* | 10/2020 | Razavi | H04B 17/336 |

FOREIGN PATENT DOCUMENTS

| | | |
|---|---|---|
| CN | 103348746 A | 10/2013 |
| CN | 104838603 A | 8/2015 |
| CN | 107734660 A | 2/2018 |
| WO | 2017020643 A1 | 2/2017 |

OTHER PUBLICATIONS

Chinese Office Action for related Chinese Application No. 201810274370.2; dated Oct. 12, 2020.
Extended European Search Report for related Application No. 19774441.0; dated April 21, 2021.
Nokia, Alcatel-Lucent Shanghai Bell, "Numerology for NR Synchronization Signals", Nov. 14-18, 2016, 3GPP TSG-WG1#87, Reno, USA.

* cited by examiner

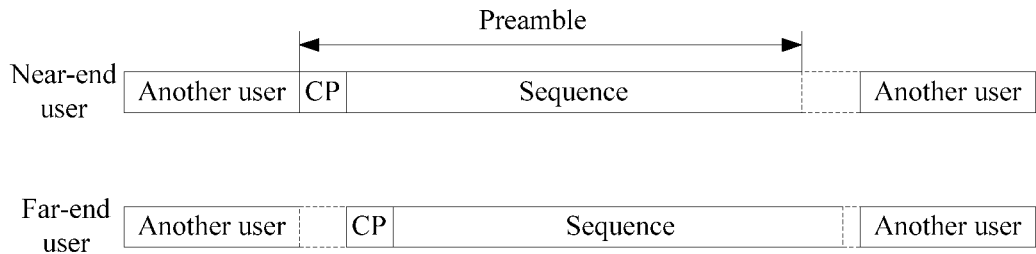
FIG. 1
In an uplink unsynchronized state, select from a preset CP candidate set a CP to send an uplink transmission signal, where the CP candidate set includes at least two types of CPs of different lengths ⎯⎯ 101
FIG. 2
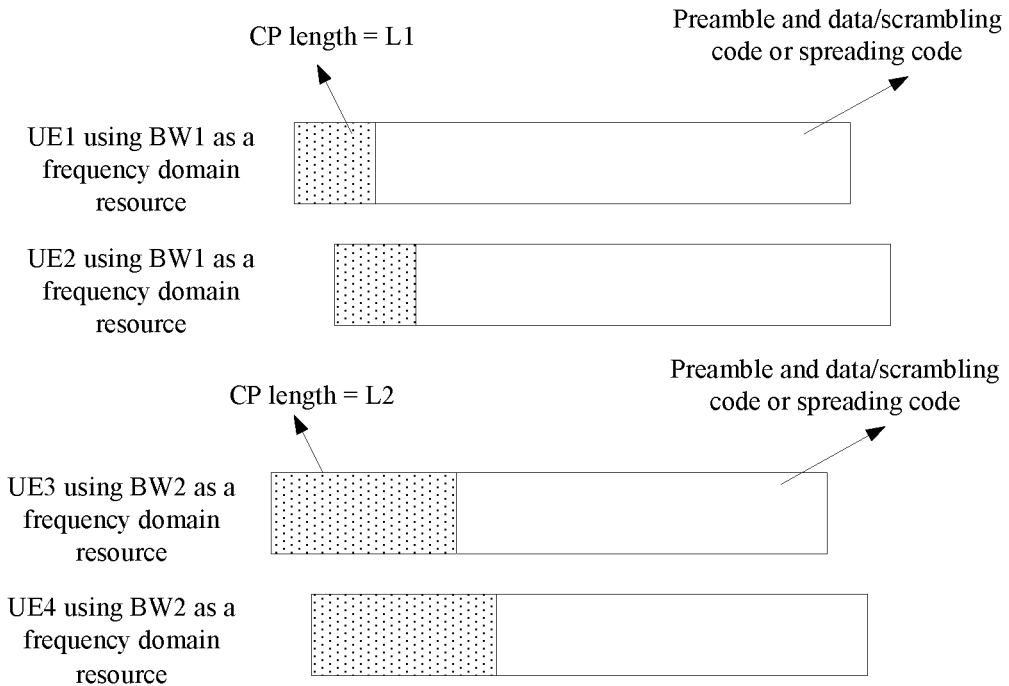
FIG. 3

UPLINK SIGNAL TRANSMISSION METHOD AND USER EQUIPMENT

CROSS-REFERENCE TO RELATED APPLICATIONS

This patent application is a bypass continuation under 35 U.S.C. § 111 of PCT Application No. PCT/CN2019/077792 filed Mar. 12, 2019, which claims priority to Chinese Patent Application No. 201810274370.2, filed in China on Mar. 29, 2018, both of which are incorporated herein by reference in their entireties.

TECHNICAL FIELD

This disclosure relates to the field of communications technologies, and in particular, to an uplink signal transmission method and user equipment.

BACKGROUND

Compared with previous mobile communications systems, a future 5G mobile communications system needs to adapt to more diverse scenarios and service requirements. Main scenarios of New Radio (NR) include Enhanced Mobile Broadband (eMBB), Massive Internet of Things (massive machine type of communication, mMTC) and ultra-reliable and low latency communications (URLLC). Such scenarios impose requirements such as high reliability, low latency, large bandwidth and broad coverage on a mobile communications system.

In a conventional uplink transmission mode, when user equipment (UE) needs to send uplink data, the user equipment first needs to implement uplink timing synchronization through a random access process. To be specific, the user equipment needs to obtain timing advance (TA) information from a network side. After implementing uplink synchronization, the UE may send the uplink data through dynamic scheduling or semi-persistent scheduling.

When an uplink packet is relatively small, the manner of sending uplink data after implementing uplink synchronization through a random access process causes extra consumption of resources and power. Therefore, in an mMTC scenario, the UE may send uplink data in an unsynchronized state.

Because UEs in the unsynchronized state cannot obtain configuration information from the network side, if UEs directly send uplink transmission signals, uplink signals of different UEs may interfere with each other.

SUMMARY

Embodiments of this disclosure provide an uplink signal transmission method and user equipment.

According to a first aspect, an embodiment of this disclosure provides an uplink signal transmission method, where the method is applied to user equipment and includes:

in an uplink unsynchronized state, selecting from a preset cyclic prefix CP candidate set a CP to send an uplink transmission signal, where the CP candidate set includes at least two types of CPs of different lengths.

According to a second aspect, an embodiment of this disclosure provides user equipment, including:

a processing module, configured to: when the user equipment is in an uplink unsynchronized state, select from a preset cyclic prefix CP candidate set a CP to send an uplink transmission signal, where the CP candidate set includes at least two types of CPs of different lengths.

According to a third aspect, an embodiment of this disclosure provides user equipment, including: a memory, a processor, and a computer program that is stored in the memory and is capable of running on the processor, where when the computer program is executed by the processor, steps of the foregoing uplink signal transmission method are implemented.

According to a fourth aspect, an embodiment of this disclosure provides a computer-readable storage medium, where the computer-readable storage medium stores a computer program, and when the computer program is executed by a processor, steps of the foregoing uplink signal transmission method are implemented.

The embodiments of this disclosure have the following beneficial effects:

In the foregoing solution, when performing uplink unsynchronized transmission, the user equipment selects from the preset CP candidate set the CP to send the uplink signal. The CP candidate set includes at least two types of CPs of different lengths, and the user equipment may select CPs of different lengths to send uplink signals, thereby reducing interference between unsynchronized uplink signals when the network-side device receives the unsynchronized uplink signals from different UEs. This can improve communication efficiency and performance.

BRIEF DESCRIPTION OF DRAWINGS

To describe the technical solutions in the embodiments of this disclosure more clearly, the following briefly describes the drawings required for describing the embodiments of this disclosure. Apparently, the drawings described below are only some of the embodiments of this disclosure. A person of ordinary skill in the art can obtain other drawings based on these drawings without creative efforts.

FIG. 1 is a schematic diagram illustrating that user equipment adds a CP to a preamble (preamble) to cancel transmission latency;

FIG. 2 is a schematic flowchart of an uplink signal transmission method according to an embodiment of this disclosure;

FIG. 3 is a schematic diagram of determining a frequency domain resource based on a selected CP according to an embodiment of the disclosure;

DETAILED DESCRIPTION

Figure 4:
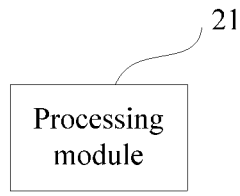
FIG. 4 is a schematic structural diagram of user equipment according to an embodiment of the disclosure.

To describe the to-be-resolved technical problems, technical solutions, and advantages in the embodiments of this disclosure more clearly, detailed descriptions are provided below with reference to the drawings and specific embodiments.

In some scenarios, if the user equipment needs to initiate uplink signal transmission in an idle or inactive state to reduce power consumption and signaling overheads, the user equipment cannot obtain configuration information from a network side because the user equipment is in an unsynchronized state. If the user equipment directly sends uplink signals, signal interference may be caused to users.

As shown in FIG. 1, similar to that in a random access process, the UE is also in an unsynchronized state when sending a random access preamble. Therefore, a cyclic prefix (CP) needs to be added to the preamble to cancel impact of transmission latency. In the technical solutions of this disclosure, signal interference caused to users may be alternatively reduced by selecting CPs of different lengths to send uplink transmission signals.

The embodiments of this disclosure provide an uplink signal transmission method and user equipment, to reduce interference between unsynchronized uplink signals when a network-side device receives the unsynchronized uplink signals from different UEs.

An embodiment of this disclosure provides an uplink signal transmission method, where the method is applied to user equipment. As shown in FIG. 2, the method includes:

Step 101: In an uplink unsynchronized state, select from a preset CP candidate set a CP to send an uplink transmission signal, where the CP candidate set includes at least two types of CPs of different lengths.

In this embodiment, when performing uplink unsynchronized transmission, the user equipment selects from the preset CP candidate set the CP to send the uplink signal. The CP candidate set includes at least two types of CPs of different lengths, and the user equipment may select CPs of different lengths to send uplink signals, thereby reducing interference between unsynchronized uplink signals when the network-side device receives the unsynchronized uplink signals from different UEs.

Further, the CP candidate set is obtained in at least one of the following manners:

predefinition in a communications protocol;

receiving a radio resource control (RRC) message from a network-side device, where the RRC message carries the CP candidate set; and receiving broadcast signaling from a network-side device, where the broadcast signaling carries the CP candidate set.

The CP candidate set may include CPs of different lengths.

The CP may be applied to an uplink random access signal, an uplink reference signal, an uplink data transmission signal, and the like.

For each different subcarrier spacing (SCS), there may be a different CP candidate set. In other words, the CP candidate set is defined or configured based on the subcarrier spacing SCS.

The UE may select an actually used CP based on configuration or predefinition information or state information in the following manners:

Manner 1: The UE selects a length of a CP based on a downlink reference signal measurement result (such as reference signal received power (RSRP)/reference signal received quality (RSRQ)).

Manner 2: A length of a CP is selected based on a movement state of the UE.

Further, the selecting from a preset CP candidate set a CP to send an uplink transmission signal includes at least one of the following manners:

selecting from the preset CP candidate set the CP based on a path loss of the user equipment; and selecting from the preset CP candidate set the CP based on a current movement state of the user equipment.

In addition, the method further includes:

measuring a downlink reference signal to obtain the path loss of the user equipment.

Further, the selecting from the preset CP candidate set the CP based on a path loss of the user equipment includes:

based on a value interval that the path loss is within, selecting a CP of a corresponding length, where the value interval is corresponding to the CP of the length.

There may be a plurality of value intervals. When there are a plurality of value intervals, each value interval is corresponding to a CP of a length.

Further, the value interval includes at least a first value interval and a second value interval, where a maximum value of the first value interval is less than a minimum value of the second value interval, and a length of a CP corresponding to the first value interval is less than a length of a CP corresponding to the second value interval.

Further, the selecting from the preset CP candidate set the CP based on a current movement state of the user equipment includes:

based on a value interval that the current movement speed of the user equipment is within, selecting a CP of a corresponding length, where the value interval is corresponding to the CP of the length.

There may be a plurality of value intervals. When there are a plurality of value intervals, each value interval is corresponding to a CP of a length.

Further, the value interval includes at least a third value interval and a fourth value interval, where a maximum value of the third value interval is less than a minimum value of the fourth value interval, and a length of a CP corresponding to the third value interval is less than a length of a CP corresponding to the fourth value interval.

In addition, the length of the CP is associated with a frequency domain resource, a transport block size (TBS), a modulation and coding scheme (MCS), and a multi-address signature (MA signature). A different length of a CP may be corresponding to a different frequency domain resource; a different length of a CP may be corresponding to a different MCS or TBS; and a different length of a CP may be corresponding to a different MA signature.

Further, the CP selected by the user equipment is used to determine at least one of the following types of configuration information of the user equipment:

a frequency domain resource;
an MCS;
a TBS; and
an MA signature.

Specifically, the network-side device may determine the foregoing configuration information of the user equipment based on the CP selected by the user equipment.

A correspondence between the selected CP and the configuration information is at least one of the following types:

a CP of each length corresponding to one frequency domain resource or one frequency domain resource set;

a CP of each length corresponding to one MCS or one MCS set;

a CP of each length corresponding to one TBS or one TBS set; and a CP of each length corresponding to one MA signature or one MA signature set.

Further, determining the MCS of the user equipment based on the selected CP includes:

determining the corresponding MCS based on the selected CP, where a CP of each length is corresponding to one MCS or one MCS set.

Further, the MCS includes a first MCS and a second MCS, a level of the first MCS is higher than a level of the second MCS, and a length of a CP corresponding to the first MCS is less than a length of a CP corresponding to the second MCS.

The MCS set includes a first MCS set and a second MCS set, a level of an MCS in the first MCS set is higher than a level of an MCS in the second MCS set, and a length of a CP corresponding to the first MCS set is less than a length of a CP corresponding to the second MCS set.

Further, determining the TBS of the user equipment based on the selected CP includes:

determining the corresponding TBS based on the selected CP, where a CP of each length is corresponding to one TBS or one TBS set.

Further, the TBS includes a first TBS and a second TBS, the first TBS is greater than the second TBS, and a length of a CP corresponding to the first TBS is less than a length of a CP corresponding to the second TBS.

The TBS set includes a first TBS set and a second TBS set, a TBS in the first TBS set is greater than a TBS in the second TBS set, and a length of a CP corresponding to the first TBS set is less than a length of a CP corresponding to the second TBS set.

Further, determining the MA signature of the user equipment based on the selected CP includes:

determining a corresponding MA signature based on the selected CP, where a CP of each length is corresponding to one MA signature or one MA signature set.

Further, the MA signature includes a first MA signature and a second MA signature, the first MA signature and the second MA signature are identical or different, and a length of a CP corresponding to the first MA signature is greater than a length of a CP corresponding to the second MA signature.

The MA signature set includes a first MA signature set and a second MA signature set, the first MA signature set and the second MA signature set are at least partially identical or totally different, and a length of a CP corresponding to the first MA signature set is greater than a length of a CP corresponding to the second MA signature set.

The following describes the uplink signal transmission method in this disclosure with reference to specific embodiments:

Embodiment 1

In this embodiment, a CP candidate set may be configured by a higher layer through an RRC message, broadcast signaling, or dedicated (dedicated) signaling. If UE has been in a connected state, a network-side device may configure the CP candidate set and a default value of a CP through UE-specific RRC signaling.

After entering an idle state, the UE may select an appropriate length of a CP based on a configured CP candidate set received in the last connected state; and if the UE starts from initial access, the network-side device configures the CP candidate set through the RRC message or the broadcast signaling, such as a system information block (SIB).

Embodiment 2

UE may select a length of a CP based on a path loss (Pathloss). The path loss may be obtained based on a downlink reference signal measurement result (such as RSRP/RSRQ), and then the length of the CP may be selected. For UE with a relatively large path loss, transmission latency is relatively large, and a relatively large length of a CP is selected; for UE with a relatively small path loss, transmission latency is relatively small, and a relatively small length of a CP is selected.

Specifically, a correspondence between the path loss and the length of the CP is shown in Table 1, where $L1<L2<L3<L4$.

TABLE 1

| Path loss (dB) | Length of a CP |
| --- | --- |
| Path loss <= X1 | L1 |
| X1 < Path loss <= X2 | L2 |
| X2 < Path loss <= X3 | L3 |
| X3 < Path loss <= X4 | L4 |

Embodiment 3

UE may select a length of a CP based on a movement state of the UE. UE that is stationary or moves slowly may select a relatively small length of a CP; and UE that moves rapidly may select a relatively large length of a CP.

Embodiment 4

Different lengths of CPs may be corresponding to different frequency domain resources or frequency domain resource sets. For example, a length 1 of a CP is corresponding to frequency domain resource bandwidth (BW) 1, and a length 2 of a CP is corresponding to frequency domain resource BW2.

In addition, a guard band needs to be reserved between frequency bands corresponding to different lengths of CPs. The UE selects the length of the CP in the foregoing method, which is equivalent to grouping of the UEs. UEs in different groups have different lengths of CPs and use different frequency bands.

Embodiment 5

Different lengths of CPs may be corresponding to different MCSs or TBSs. When a length of a CP is relatively large, a relatively small TBS may be transmitted or a relatively low MCS level may be used; or when a length of a CP is relatively small, a relatively large TBS may be transmitted or a relatively high MCS level may be used.

Embodiment 6

Different lengths of CPs may be corresponding to different MA signatures or MA signature sets. In an implementation, a relatively large length of a CP may be corresponding to a relatively long MA spreading sequence, and a relatively small length of a CP may be corresponding to a relatively short MA spreading sequence.

Embodiment 7

In this embodiment, as shown in FIG. 3, UE1 and UE2 experience relatively small transmission latency and select a CP of a length L1, and a corresponding frequency domain resource is BW1. In this case, the UE1 and the UE2 send uplink unsynchronized transmission signals on the BW1 by using the CP of a length L1. The uplink transmission signal includes the CP, a preamble, and data. The preamble is used to identify the UE. Alternatively, the preamble may not be included in the uplink transmission signal. If the preamble is not included in the uplink transmission signal, a demodulation reference signal (DMRS) and/or an MA signature (scrambling code or a spreading sequence) in the data part may be used to identify the UE.

Because UE3 and UE4 experience relatively large transmission latency, UE3 and UE4 select a CP of a relatively long length L2 to send the uplink transmission signals on a frequency domain resource BW2.

On the same BW, different UEs have CPs of the same length, and therefore signal interference caused by uplink unsynchronized transmission to users may be canceled by using the CPs. In addition, because the uplink signals are transmitted on the same frequency domain resource, different MA signatures are required to distinguish the different UEs.

An embodiment of this disclosure further provides user equipment. As shown in FIG. 4, the user equipment includes:

a processing module 21, configured to: when the user equipment is in an uplink unsynchronized state, select from a preset CP candidate set a CP to send an uplink transmission signal, where the CP candidate set includes at least two types of CPs of different lengths.

In this embodiment, when performing uplink unsynchronized transmission, the user equipment selects from the preset CP candidate set the CP to send the uplink signal. The CP candidate set includes at least two types of CPs of different lengths, and the user equipment may select CPs of different lengths to send uplink signals, thereby reducing interference between unsynchronized uplink signals when a network-side device receives the unsynchronized uplink signals from different UEs.

Further, the CP candidate set is obtained in at least one of the following manners:

predefinition in a communications protocol;

receiving an RRC message from a network-side device, where the RRC message carries the CP candidate set; and receiving broadcast signaling from a network-side device, where the broadcast signaling carries the CP candidate set.

Further, the CP candidate set is defined or configured based on SCS.

Further, the processing module 21 is specifically configured to select from the preset CP candidate set the CP to send the uplink transmission signal in at least one of the following manners:

selecting from the preset CP candidate set the CP based on a path loss of the user equipment; and selecting from the preset CP candidate set the CP based on a current movement state of the user equipment.

In addition, the user equipment further includes:

a measurement module, configured to measure a downlink reference signal to obtain the path loss of the user equipment.

Further, the processing module 21 is specifically configured to: based on a value interval that the path loss is within, select a CP of a corresponding length, where the value interval is corresponding to the CP of the length.

Further, the value interval includes at least a first value interval and a second value interval, where a maximum value of the first value interval is less than a minimum value of the second value interval, and a length of a CP corresponding to the first value interval is less than a length of a CP corresponding to the second value interval.

Further, the processing module 21 is specifically configured to: based on a value interval that the current movement speed of the user equipment is within, select a CP of a corresponding length, where the value interval is corresponding to the CP of the length.

Further, the value interval includes at least a third value interval and a fourth value interval, where a maximum value of the third value interval is less than a minimum value of the fourth value interval, and a length of a CP corresponding to the third value interval is less than a length of a CP corresponding to the fourth value interval.

Further, the CP selected by the user equipment is used to determine at least one of the following types of configuration information of the user equipment:

a frequency domain resource;
an MCS;
a TBS; and
an MA signature.

A correspondence between the selected CP and the configuration information is at least one of the following types:

a CP of each length corresponding to one frequency domain resource or one frequency domain resource set;

a CP of each length corresponding to one MCS or one MCS set;

a CP of each length corresponding to one TBS or one TBS set; and a CP of each length corresponding to one MA signature or one MA signature set.

Further, the MCS includes a first MCS and a second MCS, a level of the first MCS is higher than a level of the second MCS, and a length of a CP corresponding to the first MCS is less than a length of a CP corresponding to the second MCS.

The MCS set includes a first MCS set and a second MCS set, a level of an MCS in the first MCS set is higher than a level of an MCS in the second MCS set, and a length of a CP corresponding to the first MCS set is less than a length of a CP corresponding to the second MCS set.

Further, the TBS includes a first TBS and a second TBS, the first TBS is greater than the second TBS, and a length of a CP corresponding to the first TBS is less than a length of a CP corresponding to the second TBS.

The TBS set includes a first TBS set and a second TBS set, a TBS in the first TBS set is greater than a TBS in the second TBS set, and a length of a CP corresponding to the first TBS set is less than a length of a CP corresponding to the second TBS set.

Further, the MA signature includes a first MA signature and a second MA signature, the first MA signature and the second MA signature are identical or different, and a length of a CP corresponding to the first MA signature is greater than a length of a CP corresponding to the second MA signature.

The MA signature set includes a first MA signature set and a second MA signature set, the first MA signature set and the second MA signature set are at least partially identical or totally different, and a length of a CP corresponding to the first MA signature set is greater than a length of a CP corresponding to the second MA signature set.

An embodiment of this disclosure further provides user equipment, including: a memory, a processor, and a computer program that is stored in the memory and is capable of running on the processor, where when the computer program is executed by the processor, steps of the foregoing uplink signal transmission method are implemented.

Figure 5:
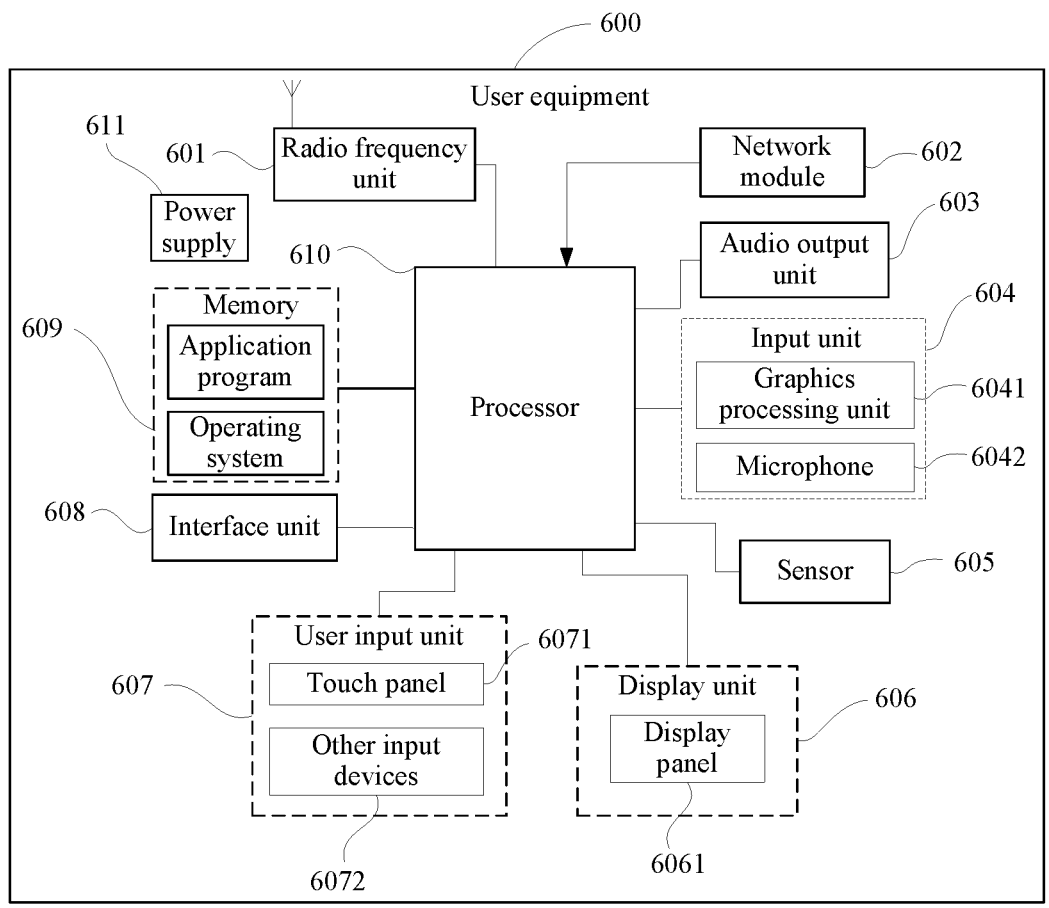
FIG. 5 is a schematic composition diagram of user equipment according to an embodiment of the disclosure.

FIG. 5 is a schematic diagram of a hardware structure of user equipment according to an embodiment of this disclosure. With reference to FIG. 5, the user equipment 600 includes but is not limited to parts such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the user equipment is not limited to a user equipment structure shown in FIG. 5. The user equipment may include more or fewer parts than those shown in the figure, or some parts may be combined, or parts may be disposed differently. In this embodiment of this disclosure, the user equipment includes but is not limited to a mobile phone, a tablet computer, a notebook computer, a palmtop computer, a vehicle-mounted terminal, a wearable device, and a pedometer.

The processor 610 is configured to: in an uplink unsynchronized state, select from a preset CP candidate set a CP to send an uplink transmission signal, where the CP candidate set includes at least two types of CPs of different lengths.

Further, the CP candidate set is obtained in at least one of the following manners:

predefinition in a communications protocol;

receiving an RRC message from a network-side device, where the RRC message carries the CP candidate set; and receiving broadcast signaling from a network-side device, where the broadcast signaling carries the CP candidate set.

The CP candidate set may include CPs of different lengths to adapt to different scenarios.

For each subcarrier spacing, there may be a different CP candidate set. In other words, the CP candidate set is defined or configured based on the subcarrier spacing SCS.

The UE may select an actually used CP based on configuration or predefinition information or state information in the following manners:

Manner 1: The UE selects a length of a CP based on a downlink reference signal measurement result.

Manner 2: A length of a CP is selected based on a movement state of the UE.

Further, the processor 610 selects from the preset CP candidate set the CP to send the uplink transmission signal in at least one of the following manners:

selecting from the preset CP candidate set the CP based on a path loss of the user equipment; and selecting from the preset CP candidate set the CP based on a current movement state of the user equipment.

Further, the processor 610 is further configured to measure a downlink reference signal to obtain the path loss of the user equipment.

Further, the processor 610 is specifically configured to: based on a value interval that the path loss is within, select a CP of a corresponding length, where the value interval is corresponding to the CP of the length.

Further, the value interval includes at least a first value interval and a second value interval, where a maximum value of the first value interval is less than a minimum value of the second value interval, and a length of a CP corresponding to the first value interval is less than a length of a CP corresponding to the second value interval.

Further, the processor 610 is specifically configured to: based on a value interval that the current movement speed of the user equipment is within, select a CP of a corresponding length, where the value interval is corresponding to the CP of the length.

Further, the value interval includes at least a third value interval and a fourth value interval, where a maximum value of the third value interval is less than a minimum value of the fourth value interval, and a length of a CP corresponding to the third value interval is less than a length of a CP corresponding to the fourth value interval.

Further, the CP selected by the user equipment is further used for determining at least one of the following types of configuration information of the user equipment:

a frequency domain resource;

an MCS;

a TBS; and an MA signature.

A correspondence between the selected CP and the configuration information is at least one of the following types:

a CP of each length corresponding to one frequency domain resource or one frequency domain resource set;

a CP of each length corresponding to one MCS or one MCS set;

a CP of each length corresponding to one TBS or one TBS set; and a CP of each length corresponding to one MA signature or one MA signature set.

Further, the MCS includes a first MCS and a second MCS, a level of the first MCS is higher than a level of the second MCS, and a length of a CP corresponding to the first MCS is less than a length of a CP corresponding to the second MCS.

The MCS set includes a first MCS set and a second MCS set, a level of an MCS in the first MCS set is higher than a level of an MCS in the second MCS set, and a length of a CP corresponding to the first MCS set is less than a length of a CP corresponding to the second MCS set.

Further, the TBS includes a first TBS and a second TBS, the first TBS is greater than the second TBS, and a length of a CP corresponding to the first TBS is less than a length of a CP corresponding to the second TBS.

The TBS set includes a first TBS set and a second TBS set, a TBS in the first TBS set is greater than a TBS in the second TBS set, and a length of a CP corresponding to the first TBS set is less than a length of a CP corresponding to the second TBS set.

Further, the MA signature includes a first MA signature and a second MA signature, the first MA signature and the second MA signature are identical or different, and a length of a CP corresponding to the first MA signature is greater than a length of a CP corresponding to the second MA signature.

The MA signature set includes a first MA signature set and a second MA signature set, the first MA signature set and the second MA signature set are at least partially identical or totally different, and a length of a CP corresponding to the first MA signature set is greater than a length of a CP corresponding to the second MA signature set.

It should be understood that in this embodiment of this disclosure, the radio frequency unit 601 may be configured to receive and send signals in an information receiving/sending process or a call process; and specifically, after receiving downlink data from a base station, send the downlink data to the processor 610 for processing, and in addition, send uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system.

The user equipment provides a user with wireless broadband Internet access by using the network module 602. For example, the user equipment helps the user send and receive emails, browse web pages, and access streaming media.

The audio output unit 603 may convert, into audio signals, the audio data that is received by the radio frequency unit 601 or the network module 602 or stored in the memory 609, and output the audio signals as sounds. In addition, the audio output unit 603 may further provide audio output related to a specific function performed by the user equipment 600 (for example, a sound prompting receiving of a call signal or a message). The audio output unit 603 includes a speaker, a buzzer, a receiver, and the like.

The input unit 604 is configured to receive audio or video signals. The input unit 604 may include a graphics processing unit (GPU) 6041 and a microphone 6042. The graphics processing unit 6041 processes image data of a static picture or a video obtained by an image capture apparatus (such as a camera) in a video capture mode or an image capture mode. A processed image frame may be displayed on the display unit 606. The image frame processed by the graphics processing unit 6041 may be stored in the memory 609 (or another storage medium) or sent by using the radio frequency unit 601 or the network module 602. The microphone 6042 may receive a sound and process such sound into audio data. The processed audio data may be converted into a format in which the audio data may be sent to a mobile communication base station through the radio frequency unit 601 for output in a telephone call mode.

The user equipment 600 further includes at least one sensor 605, such as a light sensor, a motion sensor, and another sensor. Specifically, the light sensor includes an ambient light sensor and a proximity sensor. The ambient light sensor may adjust luminance of a display panel 6061 based on brightness of ambient light. The proximity sensor may turn off the display panel 6061 and/or backlight when the user equipment 600 is moved to an ear. As a type of motion sensor, an accelerometer sensor may detect magnitudes of accelerations in all directions (usually three axes), may detect a magnitude and a direction of gravity when the mobile phone is in a static state, and may be configured to recognize a user equipment posture (such as screen switching between a portrait mode and a landscape mode, a related game, and magnetometer posture calibration), a function related to vibration recognition (such as a pedometer or tapping), and the like. The sensor 605 may further include a fingerprint sensor, a pressure sensor, an iris sensor, a molecular sensor, a gyroscope, a barometer, a hygrometer, a thermometer, or an infrared sensor. Details are not described herein.

The display unit 606 is configured to display information input by the user or information provided for the user. The display unit 606 may include the display panel 6061. The display panel 6061 may be configured in a form of a liquid crystal display (LCD), an organic light-emitting diode (OLED), or the like.

The user input unit 607 may be configured to receive input digits or character information, and generate key signal input related to a user setting and function control of the user equipment. Specifically, the user input unit 607 includes a touch panel 6071 and other input devices 6072. The touch panel 6071, also referred to as a touchscreen, may capture a touch operation performed by a user on or near the touch panel (for example, an operation performed by the user on or near the touch panel 6071 by using any appropriate object or accessory such as a finger or a stylus). The touch panel 6071 may include two parts: a touch detection apparatus and a touch controller. The touch detection apparatus detects a touch direction of the user, detects a signal caused by a touch operation, and transmits the signal to the touch controller. The touch controller receives touch information from the touch detection apparatus, converts the touch information to touch point coordinates, sends the touch point coordinates to the processor 610, and receives a command sent by the processor 610 and executes the command In addition, the touch panel 6071 may be implemented by using a plurality of types, such as a resistive type, a capacitive type, an infrared type, and a surface acoustic wave type. The user input unit 607 may further include other input devices 6072 in addition to the touch panel 6071. Specifically, the other input devices 6072 may include but are not limited to a physical keyboard, a function key (such as a volume control key or a power on/off key), a trackball, a mouse, and a joystick. Details are not described herein.

Further, the touch panel 6071 may cover the display panel 6061. After detecting a touch operation on or near the touch panel 6071, the touch panel 6071 transmits information about the touch operation to the processor 610 to determine a touch event type, and then the processor 610 provides a corresponding visual output on the display panel 6061 based on the touch event type. In FIG. 5, the touch panel 6071 and the display panel 6061 are used as two independent components to implement input and output functions of the user equipment. However, in some embodiments, the touch panel 6071 may be integrated with the display panel 6061 to implement the input and output functions of the user equipment. This is not specifically limited herein.

The interface unit 608 is an interface for connecting a peripheral to the user equipment 600. For example, the peripheral may include a wired or wireless headset port, an external power supply (or a battery charger) port, a wired or wireless data port, a memory card port, a port for connecting a device with an identification module, an audio input/output (I/O) port, a video I/O port, a headphone port, and the like. The interface unit 608 may be configured to receive input (for example, data information or power) from the peripheral and transmit the received input to one or more elements in the user equipment 600, or may be configured to transmit data between the user equipment 600 and the peripheral.

The memory 609 may be configured to store a software program and various data. The memory 609 may mainly include a program storage area and a data storage area. The program storage area may store an operating system, an application program required for at least one function (such as a sound playback function and an image playback function), and the like. The data storage area may store data created based on use of the mobile phone (such as audio data and a phone book), and the like. In addition, the memory 609 may include a high-speed random access memory, or may include a non-volatile memory, for example, at least one magnetic disk storage device, a flash memory device, or another volatile solid-state storage device.

The processor 610 is a control center of the user equipment, and is connected to all components of the entire user equipment by using various interfaces and lines. By running or executing a software program and/or a module stored in the memory 609 and invoking data stored in the memory 609, the processor 610 executes various functions of the user equipment and processes data, to perform overall monitoring on the user equipment. The processor 610 may include one or more processing units. In some embodiments, an application processor and a modem processor may be integrated into the processor 610. The application processor mainly processes an operating system, a user interface, an application program, and the like.

The modem processor mainly processes wireless communication. It may be understood that the modem processor may alternatively not be integrated into the processor 610.

The user equipment 600 may further include the power supply 611 (such as a battery) that supplies power to each component. In some embodiments, the power supply 611 may be logically connected to the processor 610 through a power management system, to implement functions such as charge management, discharge management, and power consumption management through the power management system.

In addition, the user equipment 600 includes some functional modules not shown. Details are not described herein.

An embodiment of this disclosure further provides a computer-readable storage medium. The computer-readable storage medium stores a computer program, and when the computer program is executed by a processor, steps of the foregoing uplink signal transmission method are implemented.

It can be understood that the embodiments described in this specification can be implemented by hardware, software, firmware, middleware, microcode, or a combination thereof. For hardware implementation, the processing unit can be implemented in one or more application-specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this application or a combination thereof.

For software implementation, the technology described in this specification may be implemented through modules that perform the functions (for example, processes and functions) described in this specification. The software code may be stored in the memory and executed by the processor. The memory may be implemented in the processor or outside the processor.

The embodiments in this specification are all described in a progressive manner, and each embodiment focuses on its difference from other embodiments. For the same or similar parts in the embodiments, mutual reference may be made.

A person skilled in the art should understand that the embodiments of this disclosure may be provided as a method, an apparatus, or a computer program product. Therefore, the embodiments of this disclosure may use a form of hardware only embodiments, software only embodiments, or embodiments combining software and hardware. In addition, the embodiments of this disclosure may use a form of a computer program product that is implemented on one or more computer-usable storage media (including but not limited to a disk memory, a CD-ROM, an optical memory, and the like) that include computer-usable program code.

The embodiments of this disclosure are described with reference to the flowcharts and/or block diagrams of the method, the user equipment (system), and the computer program product according to the embodiments of this disclosure. It should be understood that computer program instructions may be used to implement each process and/or each block in the flowcharts and/or the block diagrams, or a combination of processes and/or blocks in the flowcharts and/or the block diagrams. These computer program instructions may be provided for a general-purpose computer, a special-purpose computer, an embedded processor, or a processor of other programmable data processing user devices to generate a machine, so that the instructions executed by a computer or the processor of the other programmable data processing user devices generate an apparatus for implementing a specific function in one or more processes in the flowcharts and/or in one or more blocks in the block diagrams.

These computer program instructions may be alternatively stored in a computer-readable memory that can instruct the computer or the other programmable data processing user devices to work in a specific manner, so that the instructions stored in the computer-readable memory generate a product that includes an instruction apparatus. The instruction apparatus implements a specific function in one or more processes in the flowcharts and/or in one or more blocks in the block diagrams.

These computer program instructions may be loaded onto the computer or another programmable data processing user device, so that a series of operations and steps are performed on the computer or the another programmable user device, thereby generating computer-implemented processing. Therefore, the instructions executed on the computer or the another programmable user device provide steps for implementing a specific function in one or more processes in the flowcharts and/or in one or more blocks in the block diagrams.

Although some exemplary embodiments of this disclosure have been described, a person skilled in the art can make other changes and modifications to these embodiments according to the disclosed concept. Therefore, the following claims are intended to be construed as coverage of the exemplary embodiments and all changes and modifications falling within the scope of the embodiments of this disclosure.

It should be further noted that in this specification, relational terms such as first and second are only used to distinguish one entity or operation from another, and do not necessarily require or imply that any such actual relationship or sequence exists between these entities or operations. In addition, the terms "include", "comprise", or any of their variants are intended to cover a non-exclusive inclusion, so that a process, a method, an article, or user equipment that includes a list of elements not only includes those elements but also includes other elements that are not expressly listed, or further includes elements inherent to such process, method, article, or user equipment. In absence of more constraints, an element preceded by "includes a . . . " does not preclude the existence of other identical elements in the process, method, article, or user equipment that includes the element.

The foregoing descriptions are exemplary implementations of this disclosure. It should be noted that a person of ordinary skill in the art may make several improvements or modifications without departing from the principle of this disclosure, and the improvements or modifications shall fall within the protection scope of this disclosure.

What is claimed is:

1. An uplink signal transmission method, comprising:
   in an uplink unsynchronized state, selecting, by user equipment, a Cyclic Prefix CP from a preset cyclic prefix CP candidate set to send an uplink transmission signal, wherein the CP candidate set comprises at least two types of CPs of different lengths, wherein the CP candidate set is defined or configured based on subcarrier spacing SCS;
   wherein the selecting, by user equipment, a CP from a preset CP candidate set to send an uplink transmission signal comprises at least one of the following manners:
   selecting, by the user equipment, the CP from the preset CP candidate set based on a path loss of the user equipment,
   wherein the selecting, by user equipment, the CP from the preset CP candidate set based on a path loss of the user equipment comprises:

based on a value interval that the path loss is within, selecting, by the user equipment, a CP of a corresponding length, wherein the value interval is corresponding to the CP of the length and the value interval comprises at least a first value interval and a second value interval, wherein a maximum value of the first value interval is less than a minimum value of the second value interval, and a length of a CP corresponding to the first value interval is less than a length of a CP corresponding to the second value interval;

or, selecting, by the user equipment, the CP from the preset CP candidate set based on a current movement state of the user equipment, wherein the selecting, by user equipment, the CP from the preset CP candidate set based on a current movement state of the user equipment comprises:

based on a value interval that the current movement seed of the user equipment is within, selecting, by the user equipment, a CP of a corresponding length, wherein the value interval is corresponding to the CP of the length and the value interval comprises at least a third value interval and a fourth value interval, wherein a maximum value of the third value interval is less than a minimum value of the fourth value interval, and a length of a CP corresponding to the third value interval is less than a length of a CP corresponding to the fourth value interval.

2. The uplink signal transmission method according to claim 1, wherein the CP candidate set is obtained in at least one of the following manners:

predefining in a communications protocol;

receiving a radio resource control RRC message from a network-side device, wherein the RRC message carries the CP candidate set; or receiving broadcast signaling from the network-side device, wherein the broadcast signaling carries the CP candidate set.

3. The uplink signal transmission method according to claim 1, further comprising:

measuring a downlink reference signal to obtain the path loss of the user equipment.

4. The uplink signal transmission method according to claim 1, wherein the CP selected by the user equipment is used to determine at least one of the following types of configuration information of the user equipment:

a frequency domain resource;
a modulation and coding scheme MCS;
a transport block size TBS; or
a multi-address MA signature.

5. The uplink signal transmission method according to claim 4, wherein a correspondence between the selected CP and the configuration information is at least one of the following types:

a CP of each length corresponding to one frequency domain resource or one frequency domain resource set;
a CP of each length corresponding to one MCS or one MCS set;
a CP of each length corresponding to one TBS or one TBS set; or
a CP of each length corresponding to one MA signature or one MA signature set.

6. User equipment, comprising:

a processor, configured to: when the user equipment is in an uplink unsynchronized state, select a Cyclic Prefix CP from a preset cyclic prefix CP candidate set to send an uplink transmission signal, wherein the CP candidate set comprises at least two types of CPs of different lengths, wherein the CP candidate set is defined or configured based on subcarrier spacing SCS;

wherein to select a CP from a reset CP candidate set to send an uplink transmission signal, the processor is further configured to:

select the CP from the preset CP candidate set based on a path loss of the user equipment, wherein to select the CP from the preset CP candidate set based on a path loss of the user equipment, the processor is further configured to:

based on a value interval that the path loss is within, select a CP of a corresponding length, wherein the value interval is corresponding to the CP of the length and the value interval comprises at least a first value interval and second value interval, wherein a maximum value of the first value interval is less than a minimum value of the second value interval, and a length of a CP corresponding to the first value interval is less than a length of a CP corresponding to the second value interval;

or, select the CP from the preset CP candidate set based on a current movement state of the user equipment, wherein to select the CP from the preset CP candidate set based on a path loss of the user equipment, the processor is further configured to:

based on a value interval that the current movement speed of the user equipment is within, select a CP of a corresponding length, wherein the value interval is corresponding to the CP of the length and the value interval comprises at least a third value interval and a fourth value interval, wherein a maximum value of the third value interval is less than a minimum value of the fourth value interval, and a length of a CP corresponding to the third value interval is less than length of a CP corresponding to the fourth value interval.

7. The user equipment according to claim 6, wherein the CP candidate set is obtained in at least one of the following manners:

predefining in a communications protocol;

receiving a radio resource control RRC message from a network-side device, wherein the RRC message carries the CP candidate set; or receiving broadcast signaling from the network-side device, wherein the broadcast signaling carries the CP candidate set.

8. The user equipment according to claim 6, wherein the processor is further configured to:

measure a downlink reference signal to obtain the path loss of the user equipment.

9. The user equipment according to claim 6, wherein the CP selected by the user equipment is used to determine at least one of the following types of configuration information of the user equipment:

a frequency domain resource;
a modulation and coding scheme MCS;
a transport block size TBS; or
a multi-address MA signature.

10. A non-transitory computer-readable storage medium, wherein the computer-readable storage medium stores a computer program, and when the computer program is executed by a processor, perform an uplink signal transmission method, the uplink signal transmission method comprising:

in an uplink unsynchronized state, selecting a Cyclic Prefix CP from a preset cyclic prefix CP candidate set to send an uplink transmission signal, wherein the CP candidate set comprises at least two types of CPs of different lengths, wherein the CP candidate set is defined or configured based on subcarrier spacing SCS;

wherein to select a CP from a preset CP candidate set to send an uplink transmission signal, the processor is further configured to:

select the CP from the preset CP candidate set based on a path loss of the user equipment, wherein to select the CP from the preset CP candidate set bused on a path loss of the user equipment, the processor is further configured to:

based on a value interval that the path loss is within, select a CP of a corresponding length, wherein the value interval is corresponding to the CP of the length and the value interval comprises at least a first value interval and a second value interval, wherein a maximum value of the first value interval is less than a minimum value of the second value interval, and a length of a CP corresponding to the first value interval is less than a length of a CP corresponding to the second value interval;

or, select the CP from the preset CP candidate set based on a current movement state of the user equipment, wherein to select the CP from the preset CP candidate set based on a path loss of the user equipment, the processor is further configured to:

based on a value interval that the current movement speed of the user equipment is within, select a CP of a corresponding length, wherein the value interval is corresponding to the CP of the length and the value interval comprises at least a third value interval and a fourth value interval, wherein a maximum value of the third value interval is less than a minimum value of the fourth value interval, and a length of a CP corresponding to the third value interval is less than a length of a CP corresponding to the fourth value interval.

* * * * *